United States Patent [19]

Nelson

[11] Patent Number: 4,471,943

[45] Date of Patent: Sep. 18, 1984

[54] VALVE ASSEMBLY AND SEAT

[75] Inventor: Norman A. Nelson, Houston, Tex.

[73] Assignee: NL Industries, Inc., New York, N.Y.

[21] Appl. No.: 343,203

[22] Filed: Jan. 27, 1982

[51] Int. Cl.³ ............................................. F16K 3/02
[52] U.S. Cl. .................................. 251/327; 251/328; 251/333; 251/363
[58] Field of Search ............... 251/327, 328, 333, 314, 251/363

[56] References Cited

U.S. PATENT DOCUMENTS

| 3,245,429 | 4/1966 | Bacino et al. | 251/333 |
| 3,347,261 | 10/1967 | Yancey | 251/328 |
| 3,348,567 | 10/1967 | Volpin | 251/328 |
| 3,349,789 | 10/1967 | Crain et al. | 251/328 |
| 3,696,831 | 10/1972 | Fowler et al. | 251/327 |
| 4,376,526 | 3/1983 | Freeman | 251/328 |

FOREIGN PATENT DOCUMENTS 731100 6/1955 United Kingdom .
750185 6/1956 United Kingdom .
949812 2/1961 United Kingdom .

Primary Examiner—Martin P. Schwadron
Assistant Examiner—James R. Shay
Attorney, Agent, or Firm—Browning, Bushman, Zamecki & Anderson

[57] ABSTRACT

A gate valve and seat therefor, the valve including a valve body defining a longitudinal flowway and a valve element mounted in the valve body and movable transverse to the flowway between open and closed positions. A valve seat is mounted in the valve body for limited axial floating movement with respect to the valve body, the seat comprising a seat body having a generally axially facing contact face for engagement with one side of the valve element. The contact face has an annular groove therein intermediate its radially inner and outer extremities, and the seat body further has at least one vent communicating with the annular groove and extending outwardly therefrom to the radially outer extremity of the seat body.

25 Claims, 5 Drawing Figures

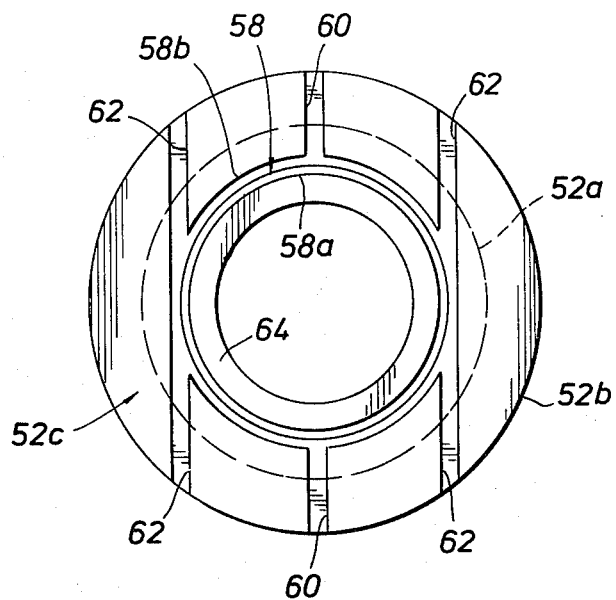
FIG. 3
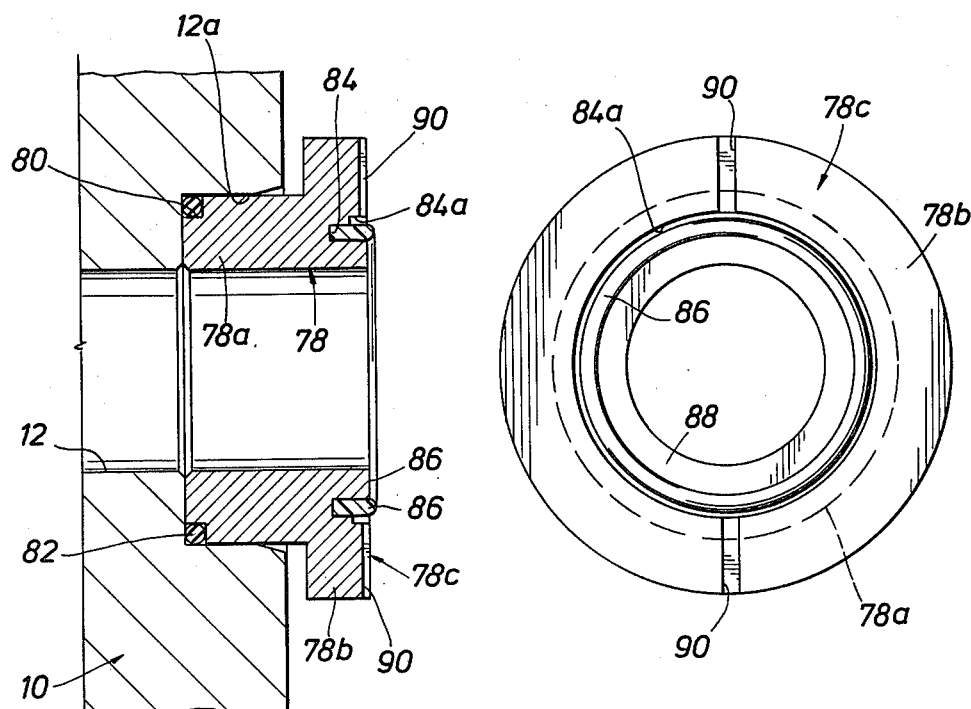
FIG. 4
FIG. 5

VALVE ASSEMBLY AND SEAT

BACKGROUND OF THE INVENTION

The present invention pertains especially to gate valves, especially through-conduit type gate valves, and seats therefor, although certain principles of the invention may also be applicable to other types of valves. A gate valve assembly typically includes a valve body defining a longitudinal flowway and a valve element mounted in the valve body and movable tranverse to the flowway. In through-conduit gate valves, this valve element, or gate, has a solid portion of sufficient dimension to block off and close the flowway when it is aligned therewith. The gate also includes a bore or port oriented parallel to the flowway. By moving the gate in the aforementioned manner, the solid portion thereof can be displaced from alignment with the flowway, and the port moved into alignment with the flowway to open the valve. Such valves also typically include annular valve seats mounted in the valve body, coaxially with the flowway, on opposite sides of the gate, for sealing engagement with the latter.

In some types of gate valve assemblies, the valve seats are fixedly mounted in the valve body. The gate of such a valve assembly is formed in multiple parts which, when the valve is closed, are expanded longitudinally against the valve seats to form tight seals. In other valve assemblies, so called "floating seats" are employed. These seats are permitted limited axial play with respect to the valve body, and it is by virtue of such movement that they sealingly engage the gate. Floating seats are a virtual necessity for proper upstream sealing where the gate is of the "slab" or simple, straight-sided, one piece variety.

One of the advantages of through-conduit gate valve assemblies for oil field use, or other uses in which the fluid being handled may contain abrasive material, is that the gate periodically wipes the sealing faces of the seats as it is moved between its open and closed positions, and even when in the open position, remains in contact with the sealing areas of the seats, thereby protecting them. However, these types of valves also involve disadvantages, some of which are inversely related such that prior attempts to alleviate one of the problems would aggravate the other.

One such problem revolves around the force required to open the valve. This force is dependent on the sliding friction forces between the gate and seats. Even in those valve assemblies which are designed to seal only at the downstream seat, the operating force is a function of the outer diameter of the annular sealing area of the downstream seat. Where the valve also provides a secondary seal at the upstream seat, the operating force is further magnified. Logically, a reduction in the outer diameter of the seat's sealing area would correct this problem. However, too much reduction in this diameter will magnify a different problem revolving around the need for adequate bearing area. Since the sealing area and bearing area of the conventional valve seat are coextensive, a reduction in the sealing area also reduces the bearing area. This is particularly undesirable in high-pressure valves, especially since the applicable industry standards require the use of relatively soft metals. It can be seen that, particularly with such relatively soft metals, if a high-pressure force is distributed over only a very small bearing area, galling and material failure can occur.

A third common problem with these types of valve assemblies is related to the fact that the valve body defines cavities adjacent the flowway for receipt of the gate. During normal operation with the valve open, pressurized fluid may enter these cavities. In any event, when the valve is moved to its closed position, this pressurized fluid will enter the cavities and may become trapped in the valve body. More particularly, this trapping occurs in assemblies with floating seats where the diameter of the seal between the seat and valve body is less than the diameter of the sealing area of the seat against the gate. With this relationship in diameters, the pressure already within the cavities in the valve body will urge the seats into even tighter engagement with the gate, which increases the force necessary to reopen the valve. In the meantime, with the valve still closed, the trapped fluid within the valve body makes it susceptible to explosion, representing an extremely dangerous situation.

SUMMARY OF THE INVENTION

In accord with the present invention, the generally axially facing annular contact face of the valve seat, which face engages the gate in use, is provided with an annular groove therein intermediate its radially inner and outer extremities. The seat also has vent means communicating with this annular groove and extending outwardly therefrom through the radially outer periphery of said seat body. This reduces the outer diameter of the sealing area of the contact face without substantially reducing the bearing area. Furthermore, if the inner diameter of the aforementioned groove is less than the effective sealing surface diameter between the valve seat and valve body, any pressurized fluid within the gate cavities of the valve body when the valve is closed will tend to urge the seat away from, rather than toward, the gate, so that the fluid will not become trapped in the valve body.

In preferred embodiments of the invention, the main body of the seat itself comprises a sleeve-like portion for mounting on the valve body and a flange extending radially outwardly from one end of the sleeve-like portion, the aforementioned contact face being defined by said one end of the sleeve-like portion and the adjacent side of the flange. The vent means mentioned above is preferably defined by a plurality of vent grooves formed in the contact face. In any event, the portion of the contact face intermediate the annular groove and the radially inner extremity of the contact face defines a metal-to-metal seal area which, as mentioned above, is substantially less than the bearing area of the contact face. if desired, a deformable seal ring may also be mounted in the seat body at the contact face contiguous this annular metal seal area and the aforementioned annular groove. The annular groove defines a recess disposed radially outwardly of the deformable seal ring.

It is a principal object of the present invention to provide an improved valve seat.

It is another object of the invention to provide an improved gate valve assembly having at least one floating-type seat.

Still another object of the present invention is to provide such a valve assembly and/or seat in which the seat contact face is provided with an annular groove intermediate its inner and outer extremities, the seat further having vent means communicating with this groove and extending outwardly through the seat body.

A further object of the present invention is to provide such an improved seat and/or valve assembly in which the sealing area of the contact face of the seat is substantially less than the bearing area thereof.

Yet another object of the present invention is to provide such a valve assembly and/or seat in which the outer diameter of the sealing area of the seat against the gate is less than the sealing diameter between the seat and the valve body.

Still a further object of the present invention is to provide such a valve assembly and/or seat which may be provided with a deformable seal ring contiguous the annular groove in the contact face.

Still other objects, features, and advantages of the present invention will be made apparent by the following detailed description, the drawings, and the claims.

BRIEF DESCRIPTION OF THE DRAWINGS

FIG. 3 is an enlarged end view of the contact face of the valve seat taken along the line 3—3 of FIG. 2.

FIG. 4 is a longitudinal sectional view through a modified form of valve seat.

FIG. 5 is an end elevational view of the embodiment of FIG. 4.

DETAILED DESCRIPTION

Figure 1:
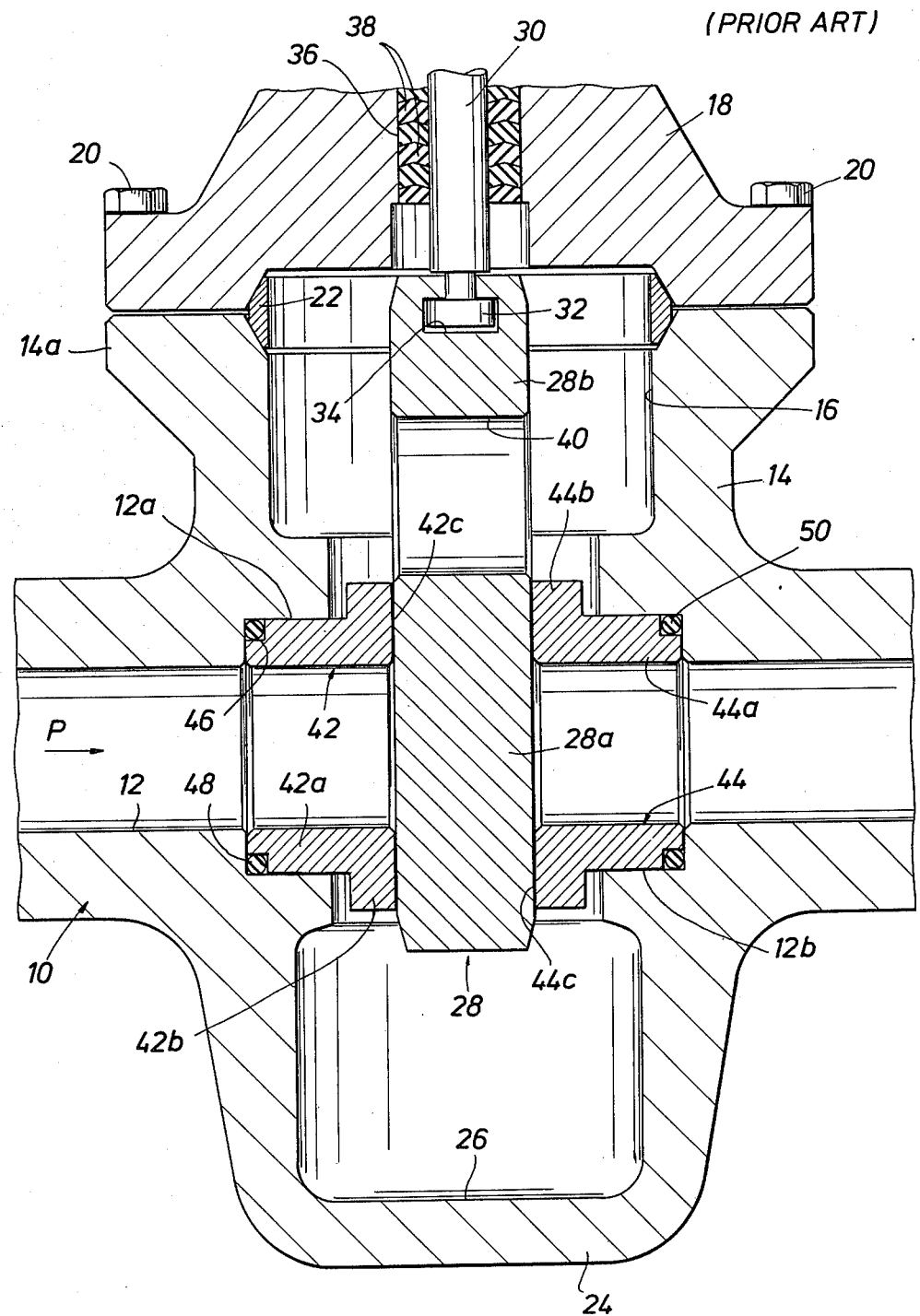
FIG. 1 is a longitudinal sectional view through a prior art gate valve assembly.

FIG. 1 illustrates what will, for simplicity, be referred to as a "prior art" gate valve assembly. Although FIG. 1 does not necessarily accurately illustrate any one known item of prior art, it generally typifies the prior art, and is illustrative of the principles and problems involved. The assembly of FIG. 1 includes a valve body 10 which has an elongate flowway 12 therethrough. As used herein, terms such as "longitudinal," "circumferential," and "radial" will be used with reference to the flowway 12 and the corresponding bores of the valve seats, unless otherwise noted. Also, terms such as "upwardly" and "downwardly" will refer to the apparatus as it is shown in the drawings, although it should be understood that the apparatus might be disposed in other positions in actual use, so that these latter terms should not be construed in a limiting sense. The side portions of valve body 10 adjacent the opposite ends of flowway 12 (not shown) are adapted for connection into a flow conductor such as a pipeline or other conduit. Valve body 10 has a hollow extension 14 extending upwardly away from flowway 12. Projection 14 defines a cavity 16 which intersects flowway 12. A bonnet 18 is connected to a flange 14a at the upper end of projection 14 by bolts 20, so that bonnet 18 completes and generally closes cavity 16. A metal seal 22 is provided at the interface of projection 14 and bonnet 18 and at their inner diameters. A closed projection 24 extends downwardly generally opposite projection 14 and defines a cavity 26 intersecting flowway 12.

A valve element in the form of a slab-type gate 28 is mounted in valve body 10. Gate 28 lies transverse to flowway 12, and is also movable within body 10 in a direction transverse to flowway 12, more particularly in a vertical directional mode as shown in the drawing. A valve stem 30 is secured to the upper end of gate 28 by mating key formation 32 on the lower end of valve stem 30 and slot 34 in the upper end of gate 28. Stem 30 extends upwardly through a vertical bore 36 which serves as a stuffing box in bonnet 18, and is sealed with respect thereto by packings 38. The upper end (not shown) of valve stem 30 is attached to a suitable actuator by which the valve stem 30 and attached gate 28 may be moved upwardly and downwardly.

The lower portion of gate 28 is solid as shown at 28a so that, when gate 28 is in its uppermost position as shown, solid portion 28a lies transversely across flowway 12 to close the valve. In this position, cavity 16 provides a space for receipt of the upper portion 28b of gate 28. Said upper portion 28b has a port or bore 40 extending therethrough parallel to flowway 12. When gate 28 is moved downwardly, port 40 is brought into alignment with flowway 12 to open the valve. Cavity 26 provides a space for receipt of lower portion 28a of gate 28 to allow such movement.

Flowway 12 is counterbored, as indicated at 12a and 12b, at its points of intersection with cavities 16 and 26. Annular valve seats comprising seat bodies 42 and 44 are mounted in valve body 10 on opposite sides of gate 28. The upstream seat body 42 comprises a sleeve-like, and more specifically generally cylindrical, portion 42a and an annular flange 42b extending radially outwardly from one end of portion 42a. The opposite end of portion 42a is mounted in counterbore 12a. The axially innermost side of flange 42b and the contiguous end surface of sleeve-like portion 42a of seat body 42 define an annular contact face 42c for engagement with gate 28. Except for a small bevel at the inner diameter, contact face 42c covers the full radial extent of the seat body. Face 42c is planar, for sliding engagement with the planar side of gate 28, and defines not only the bearing area of seat body 42 against gate 28, but also a metal-to-metal sealing area.

The sleeve-like portion 42a of seat body 42 has an external annular groove 46 at the end opposite flange 42b. An O-ring 48 is carried in groove 46 so that its outer diameter forms an annular body sealing surface for sealing engagement with counterbore 12a of valve body 10. Because O-ring 48 is exposed along the axial end of seat body 42, and further because it is compressed against the shoulder between flowway 12 and counterbore 12a when the valve is assembled, it will act as a spring resiliently biasing seat body 42 toward gate 28, while permitting limited axial play or floating action of the seat body.

The downstream valve seat is a mirror image of the upstream valve seat, and thus, will not be described in detail. Briefly, its seat body 44 includes a cylindrical sleeve-like portion 44a, a radial flange 44b, a contact face 44c, and an O-ring 50, similar to parts 42a, 42b, 42c, and 48 respectively of the upstream seat. The O-ring 50 both seals and resiliently biases the seat with respect to the valve body.

When the valve is in its closed position as shown, pressure upstream acts in the direction of arrow P to urge gate 28 against contact face 44c of the downstream valve seat with a force proportional to pressure. This increases the frictional forces between the gate and downstream seat, which in turn increases the force necessary to open the valve. It can be shown that the latter force is also a direct function of the outer diameter of the contact face 44c which is a metal-to-metal sealing surface engaging gate 28. Since, in the embodiment shown an upstream seal is also provided, by virtue of floating seat body 42, the force necessary to open the valve is even further increased. However, a reduction in the outer diameter of contact face 44c, in an effort to decrease the sealing area, and thus, the operating force, would also decrease the bearing area of seat body 44 available for contact with gate 28. This is particularly undesirable in a high-pressure situation, wherein a large force is distributed over only a small area, particularly since industry standards require relatively soft metals in such valves. The result can be galling and/or material failure.

Prior art valves such as are shown in FIG. 1 also involve a problem of trapping of fluid pressure within the valve body. For example, assume that a second valve assembly (not shown) is disposed downstream of the assembly of FIG. 1, and that both valves are open and the fluid in the line is under pressure. Further assume that the downstream valve is closed first, followed by closing of the valve of FIG. 1. If the line pressure is then reduced, both upstream and downstream, pressurized fluid will be trapped in cavities 16 and 26. This pressurized fluid would be prevented from leaking out past the valve seats in the case of the upstream seat for example, by the seals which are formed at face 42c and the O-ring seal 48. The annular area between the outer diameter of sealing area 42c and the inner diameter of O-ring 48 on the upstream seat serves as an annular piston on which the trapped fluid can act. Because the inner diameter of the axially outermost seal 48 is less than the outer diameter of axially inner sealing area 42c, the trapped pressure will serve to urge the seat body 42 even more tightly against gate 28, thereby trapping the fluid in cavities 16 and 26. This not only increases the force necessary to reopen the valve, but presents a dangerous situation.

Figure 2:
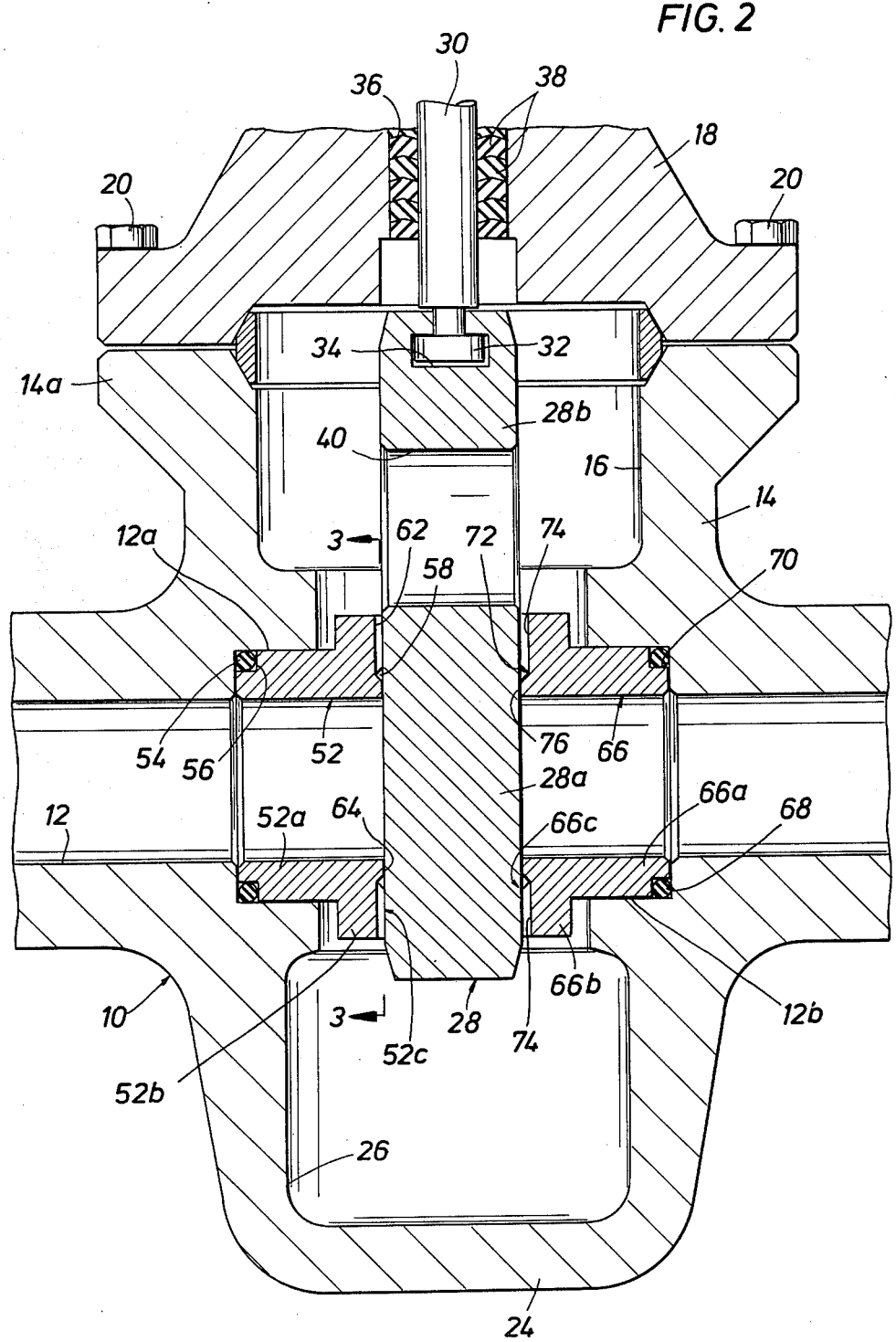
FIG. 2 is a view similar to that of FIG. 1 showing the present invention.

Turning now to FIG. 2, there is shown a gate valve assembly in accord with a first embodiment of the present invention. All parts of the assembly except for the valve seats are virtually identical to the corresponding parts of the valve assembly of FIG. 1. Accordingly, like parts in FIGS. 1 and 2 have been given like reference numerals, and these parts, e.g. the valve body 10, bonnet 18, and gate 28, will not be again described in detail in connection with FIG. 2.

The upstream valve seat of the embodiment of FIG. 2 is similar to the upstream valve seat of the prior art in that it comprises a seat body 52 and an O-ring type seal 54, the seat body 52 including a sleeve-like portion 52a and a flange 52b extending radially outwardly from one end of the sleeve-like portion 52a. The O-ring 54 is likewise carried in an external annular groove 56 at the opposite end of sleeve-like portion 52a from flange 52b. However, seat body 52 differs from seat body 42 of FIG. 1 in that its contact face 52c, defined by the right-hand end of sleeve-like portion 52a and the contiguous side of flange 52b, has been machined in a manner best seen by comparing FIGS. 2 and 3. More specifically, an annular groove 58 has been formed in face 52c intermediate its radially inner and outer extremities. Groove 58 is generally V-shaped in cross section, having inner diameter 58a and outer diameter 58b. Also machined in face 52c are a plurality of parallel vent grooves 60 and 62. Vent grooves 60 are oriented radially with respect to groove 58, while vent grooves 62 are oriented tangentially to groove 58. All of the grooves 60 and 62 intersect or communicate with groove 58 and extend outwardly therefrom across face 52c. For a purpose to be described more fully below, the machining of grooves 58, 60, and 62 leaves a substantially uninterrupted annular sealing area 64 intermediate groove 58 and the radially inner extremity of face 52c.

The downstream seat is a mirror image of the upstream seat, comprising a seat body 66 with sleeve-like portion 66a and flange 66b, a body O-ring seal 68 being carried in an external annular groove 70 in the end of sleeve-like portion 66a which is mounted in the valve body. Like face 52c of the upstream seat body, the annular contact face 66c of the downstream seat body has machined therein an annular groove 72 and a plurality of vent grooves, two of which are shown at 74.

Referring still to FIGS. 2 and 3, it can be seen that, due to the venting system comprised of annular groove 58 and vent grooves 60 and 62, only the uninterrupted annular area 64 defined between the inner diameter 58a of groove 58 and the inner diameter of face 52c as a whole will seal against the upstream side of gate 28. Likewise, an uninterrupted annular seal area 76 is formed between groove 72 of the downstream seat body 66 and the inner diameter of that body, and area 76 is the only portion of contact face 66c which seals against the downstream side of gate 28. Because the inner diameters of the grooves 58 and 72 are substantially less than the outer diameters of the corresponding contact faces 52c and 66c, these annular sealing areas are much smaller than, for example, those of the prior art seats of FIG. 1, even though those seats have similar overall inner and outer contact face diameters. This reduction in the sealing area, particularly on the downstream seat body 66, substantially reduces the pressure force and resultant operating force needed to open the valves. However, the reduction in bearing area is negligible. More specifically, the entire surface area of contact faces 52c and 66c, exclusive of the grooves 58, 60, 62, 72, and 74, is available for distribution of the bearing load against gate 28.

Another salient feature of the valve seats of FIGS. 2 and 3 is that they eliminate the problem of trapping of pressurized fluid within the valve body cavities 16 and 26. As mentioned, the area of sealing engagement between the gate 28 and each of the seat contact faces 52c and 66c extends only from the inner diameter of the contact face to the inner diameter of its respective annular groove 58 or 72. The latter diameter is less than the inner diameter of the O-ring 54 or 68 which defines the effective sealing diameter for sealing engagement between the respective valve seat and the valve body. Therefore, pressurized fluid trapped in the valve body will tend to urge the floating seats away from the gate 28, so that the fluid can leak out of the cavities 16 and 26, relieving the pressure therein, past one or the other of the seat bodies.

Referring now to FIGS. 4 and 5, there is shown a second embodiment of valve seat according to the present invention. Once again, the seat comprises a seat body 78 having a sleeve-like portion 78a with a flange 78b extending radially outwardly from one end of the sleeve-like portion 78a. That end of sleeve-like portion 78a and the contiguous side of flange 78b define and annular contact face 78c for engagement with a valve gate. The other end of sleeve-like portion 78a is mounted in a counterbore 12a of the flowway 12 of the valve body 10 and has an external annular groove 80 which carries an O-ring 82 for sealing against the valve body and resiliently biasing the seat body 78 toward the valve gate.

As in the first embodiment, an annular groove has been formed in contact face 78c intermediate its radially inner and outer extremities. In the embodiment of FIG. 4, the annular groove has a radially innermost deep portion 84 and a shallower portion 84a on its radially outer perimeter. A deformable seal ring 86 is mounted in the deep radially inner portion of groove 84, by bonding or in any other suitable manner, and protrudes slightly from face 78c for sealing engagement with the valve gate. The uninterrupted annular metal surface 88 disposed between groove 84 and the inner diameter of face 78c still provides a metal-to-metal seal. A pair of vent grooves 90 are also machined into face 78c intersecting recess 84a and extending radially outwardly therefrom through the outer periphery of the seat body 78. The grooves 84a and 90 serve, as in the preceding embodiment, to reduce the effective metal-to-metal sealing area against the valve gate, without substantially reducing the bearing area of the contact face 78c, thereby reducing the operating force and preventing the trapping of pressurized fluid within the valve body. Recess 84a also allows for deformation of ring 86 when it is compressed by the valve gate.

The foregoing represent only two preferred embodiments of the present invention, and numerous other modifications may suggest themselves to those of skill in the art. For example, in each of the embodiments shown, the annular sealing area on the valve seat for sealing engagement with the valve body is defined by an O-ring carried by the valve seat body. However, the body seal area could be an O-ring carried in an internal groove in the valve body. In any event, such a seal could be disposed anywhere along the length of the seat body, and if not located at the axially outer end thereof, other resilient biasing means for the floating seat body could be provided. In other modifications, a seal may be provided only on the downstream side of the gate and/or the seat may not be mounted in a counterbore or pocket in the valve body.

Other modifications might involve changes in the configuration of the seat body itself. For example, the number, size, and arrangement of any vent grooves on the contact face could be varied. However, it is not even necessary that the vent means which communicate with the annular groove in the contact face be in the form of other grooves machined in that same contact face. The vent means could be comprised of one or more internal bores extending through the seat body, it only being necessary that the vent means communicate with the annular groove and extend through the outer periphery of the seat body (either through the flange or through the sleeve-like portion) and axially inwardly of the seal between the seat body and the valve body. Also, in the embodiments shown, the radially inner metal-to-metal sealing area on the gate contact face of the seat is substantially uninterrupted and extends to the inner diameter of the seat. However, it is only necessary that an annular area capable of metal-to-metal sealing be provided somewhere between the annular groove and the seat I.D. Thus, for example, the contact face may be provided with additional unvented annular grooves located radially inwardly of the vented groove, or the I.D. of the contact face might be bevelled.

Still other modifications are encompassed within the spirit of the invention. Accordingly, it is intended that the scope of the invention be limited only by the claims which follow.

I claim:

1. An annular seat for a valve assembly comprising:

a seat body having at one end a generally axially inwardly facing annular contact face for engagement with a valve element, and further having annular body seal means on the outer periphery of said seat body and spaced axially outwardly from said contact face for sealing engagement with a valve body;

said contact face having an annular groove therein intermediate its radially inner and outer extremities and an annular sealing area intermediate said annular groove and the inner extremity of said contact face;

said seat body further having vent means intersecting and communicating with said annular groove, extending outwardly from said annular groove, and opening through the radially outer periphery of said seat body axially inwardly of the axially innermost extremity of said body seal means, said vent means being adapted to permit fluid pressure communication generally radially inwardly and outwardly therethrough;

surfaces of said contact face both radially inwardly and radially outwardly of said annular groove being colinear in at least one longitudinal cross-sectional plane to cooperatively serve as bearing area for said contact face.

2. A valve seat according to claim 1 wherein the inner diameter of said annular groove is less than the effective sealing diameter of said body seal means.

3. A valve seat according to claim 2 wherein said body seal means comprises an elastomeric seal carried on said seat body.

4. A valve seat according to claim 1 wherein said seat body comprises a sleeve-like portion for mounting in a valve body and a flange extending radially outwardly from one end of said sleeve-like portion, said contact face being defined by said one end of said sleeve-like portion and the adjacent side of said flange.

5. A valve seat according to claim 4 wherein said contact face, exclusive of said annular groove and said vent means, is substantially planar.

6. A valve seat according to claim 1 wherein said vent means is defined by a plurality of vent grooves formed in said contact face.

7. A valve seat according to claim 6 wherein said vent grooves are generally parallel to one another, and include at least some vent grooves oriented radially with respect to said annular groove, and other vent grooves oriented tangentially to said annular groove.

8. An annular seat for a valve assembly comprising an integral seat body having at one end a generally axially inwardly facing annular contact face for engagement with a valve element, and a deformable seal ring mounted in said seat body at said contact face, said contact face having an annular groove therein defining a recess disposed contiguous and radially outwardly of said seal ring, and said seat body further having vent means communicating with said annular groove and extending outwardly from said annular groove through the radially outer periphery of said seat body.

9. A valve seat according to claim 8 wherein said seat body is comprised of a metal, and said contact face comprises an annular metal-to-metal sealing area intermediate said seal ring and the inner extremity of said contact face.

10. A valve seat according to claim 9 wherein said vent means is defined by a plurality of vent grooves formed in said contact face.

11. A valve seat according to claim 10 wherein said seat body comprises a sleeve-like portion for mounting in a valve body and an annular flange extending radially outwardly from one end of said sleeve-like portion, said contact face being defined by said one end of said sleeve-like portion and the adjacent side of said flange.

12. A valve seat according to claim 11 comprising means defining an annular body seal on the outer periphery of said sleeve-like portion of said seat body for sealing engagement with a valve body, and wherein the inner diameter of said recess is less than the effective sealing diameter of said body seal.

13. A valve seat according to claim 12 wherein said body seal means comprises an elastomeric seal carried on said seat body.

14. A gate valve assembly comprising:
a valve body defining a longitudinal flowway and a cavity, transverse to and intersecting said flowway, for receipt of a valve element;
a valve element mounted on said valve body for disposition at least partially in said cavity and partially in said flowway and movable transverse to said flowway between a first position opening said flowway and a second position closing said flowway;
at least one valve seat mounted in said valve body for limited axial floating movement with respect to said valve body and disposed generally coaxially with said flowway, said seat comprising a seat body having on its axially inner end a generally axially facing contact face for engagement with one side of said valve element, said contact face having an annular groove therein intermediate its radially inner and outer extremities, said seat body further having vent means intersecting and communicating with said annular groove and extending outwardly from said annular groove through the radially outer periphery of said seat body and adapted to permit fluid pressure communication generally radially inwardly and outwardly between said groove and said cavity, surfaces of said contact face both radially inwardly and radially outwardly of said annular groove being colinear in a cross-sectional plane parallel to both the centerline of said seat body and to the direction of movement of said valve element to cooperatively serve as bearing area for said contact face.

15. The apparatus of claim 14 wherein said seat body comprises a generally sleeve-like portion and an annular flange extending radially outwardly from one end of said sleeve-like portion, said contact face being defined by said one end of said sleeve-like portion and the adjacent side of said flange, and the other end of said sleeve-like portion being mounted on said valve body.

16. The apparatus of claim 15 further comprising an annular body seal mounted axially outwardly of said vent means for sealing engagement between said valve seat and said valve body, and wherein the diameter of said annular groove is less than the sealing diameter of said body seal.

17. The apparatus of claim 16 wherein said body seal is an elastomeric seal carried on the outer diameter of said sleeve-like portion of said valve seat and at said other end of said sleeve-like portion, whereby said body seal may also serve as a biasing means for urging said seat body toward said valve element.

18. The apparatus of claim 14 wherein said vent means comprises a plurality of vent grooves formed in said contact face of said seat body.

19. The apparatus of claim 15 wherein said contact face comprises an annular seal area disposed intermediate said annular groove and the radially inner extremity of said contact face.

20. The apparatus of claim 19 wherein said seal area of said contact face is substantially planar.

21. The apparatus of claim 19 wherein said valve seat further comprises a deformable seal ring mounted in said seat body at said contact face contiguous said annular seal area and said annular groove, said annular seal area being disposed radially inwardly of said deformable seal ring, and said annular groove defining a recess disposed radially outwardly of said deformable seal ring.

22. A valve seat according to claim 4 wherein said vent means opens through the radially outer periphery of said flange.

23. A valve seat according to claim 9 wherein said vent means is adapted to cause the portion of said contact face radially outwardly of said groove to form a non-sealing bearing surface.

24. A valve seat according to claim 23 wherein said sealing area and said bearing surface, exclusive of said vent means, are colinear in at least one longitudinal cross-sectional plane.

25. A valve assembly according to claim 8 further comprising annular body seal means on the outer periphery of said seat body and spaced axially outwardly from said contact face for sealing engagement with a valve body, and wherein said vent means opens through the radially outer periphery of said seat body axially inwardly of the axially innermost extremity of said body seal means.

* * * * *